(12) United States Patent
Plank

(10) Patent No.: US 11,762,096 B2
(45) Date of Patent: Sep. 19, 2023

(54) METHODS AND APPARATUSES FOR DETERMINING ROTATION PARAMETERS FOR CONVERSION BETWEEN COORDINATE SYSTEMS

(71) Applicant: Infineon Technologies AG, Neubiberg (DE)

(72) Inventor: Hannes Plank, Graz (AT)

(73) Assignee: Infineon Technologies AG, Neubiberg (DE)

(*) Notice: Subject to any disclaimer, the term of this patent is extended or adjusted under 35 U.S.C. 154(b) by 752 days.

(21) Appl. No.: 16/707,352

(22) Filed: Dec. 9, 2019

(65) Prior Publication Data

US 2020/0183014 A1    Jun. 11, 2020

(30) Foreign Application Priority Data

Dec. 10, 2018   (EP) .................................. 18211278
Apr. 8, 2019    (EP) .................................. 19167922

(51) Int. Cl.
*G01S 17/894*   (2020.01)
*G06T 7/33*     (2017.01)
(Continued)

(52) U.S. Cl.
CPC ............ *G01S 17/894* (2020.01); *G06T 3/60* (2013.01); *G06T 7/33* (2017.01); *H04N 23/56* (2023.01)

(58) Field of Classification Search
CPC ........... G01S 17/894; G06T 7/33; G06T 3/60
See application file for complete search history.

(56) References Cited

U.S. PATENT DOCUMENTS 7,307,737 B1   12/2007  Kling, III et al.
2009/0259432 A1  10/2009  Liberty et al.
(Continued)

FOREIGN PATENT DOCUMENTS

CN     1934459 A     3/2007
CN   102252653 A    11/2011
(Continued)

OTHER PUBLICATIONS

Lindner, Marvin, et al., "Calibration of the Intensity-Related Distance Error of the PMD TOF-Camera", Proceedings of the International Society for Optical Engineering, vol. 6764, Dec. 31, 2007, pp. 1-8.
(Continued)

*Primary Examiner* — Luke D Ratcliffe
(74) *Attorney, Agent, or Firm* — Murphy, Bilak & Homiller, PLLC

(57) ABSTRACT

A tag for time-of-flight (ToF) applications includes: at least three light sources configured to controllably emit light; a light detector configured to receive one or more modulated light signals from a ToF camera system; and a processing circuit configured to determine one or more time periods in which the ToF camera system is sensitive for light reception and control the at least three light sources to sequentially and individually emit light according to a predefined lighting pattern during the one or more time periods. Corresponding apparatuses and methods for determining rotation and/or translation parameters for conversion between different coordinate systems are also provided.

11 Claims, 11 Drawing Sheets

(51) Int. Cl.
G06T 3/60 (2006.01)
H04N 23/56 (2023.01)

(56) References Cited

U.S. PATENT DOCUMENTS

| | | | |
|---|---|---|---|
| 2010/0231513 A1* | 9/2010 | Deliwala | G01S 5/163 |
| | | | 345/158 |
| 2015/0235367 A1 | 8/2015 | Langer et al. | |
| 2017/0354342 A1* | 12/2017 | Ben-Yishai | A61B 34/10 |
| 2018/0146186 A1 | 5/2018 | Akkaya et al. | |
| 2018/0317803 A1 | 11/2018 | Ben-Yishai et al. | |
| 2018/0329024 A1* | 11/2018 | Send | G01S 17/46 |
| 2021/0223395 A1* | 7/2021 | Valouch | G02B 27/1013 |

FOREIGN PATENT DOCUMENTS

| | | |
|---|---|---|
| CN | 103679711 A | 3/2014 |
| CN | 104596444 A | 5/2015 |
| CN | 104976968 A | 10/2015 |
| DE | 102013209721 A1 | 2/2014 |
| WO | WO-2008145158 A1 * 12/2008 | ............. E02F 3/431 |

OTHER PUBLICATIONS

Sun, Zhe, et al., "In-depth data fusion of TOF and stereo vision system based on confidence level", Journal of Beijing University of Aeronautics and Astronautics, vol. 44, No. 8; English Abstract attached, Aug. 31, 2018, pp. 1764-1771.

* cited by examiner

METHODS AND APPARATUSES FOR DETERMINING ROTATION PARAMETERS FOR CONVERSION BETWEEN COORDINATE SYSTEMS

TECHNICAL FIELD

The present disclosure relates to six-Degrees-of-Freedom (6DoF) localization of electronic devices by means of a Time-of-Flight (ToF) camera. In particular, examples relate to a method and an apparatus for determining rotation parameters for conversion between a first coordinate system associated with a tag and a second coordinate system associated with a ToF camera system configured for sensing the tag. Further examples relate to a method for determining translation and rotation parameters for conversion between a third coordinate system and a second coordinate system associated with a ToF camera system. Other examples further relate to a tag for ToF applications.

BACKGROUND

6DoF refers to the freedom of movement of a body in three-dimensional space. Specifically, the body is free to change its position as translation along the three perpendicular axes of the three-dimensional space, combined with changes in orientation through rotation about the three perpendicular axes of the three-dimensional space.

Knowledge about the relative position and orientation of a camera system like a ToF camera with respect to another device is for example required to correctly render three-dimensional objects into a user's field of view in augmented reality applications. It is not possible for the camera system to determine its relative position and orientation from a single point.

Conventional localization approaches require objects of certain size and multiple markers for determining rotation parameters that enable conversion between coordinate systems associated with the camera and the object.

SUMMARY

Hence, there may be a demand for improved determination of rotation parameters for conversion between different coordinate systems.

The demand may be satisfied by the subject matter of the appended claims.

An example relates to a method for determining rotation parameters for conversion between a first coordinate system associated with a tag and a second coordinate system associated with a ToF camera system configured for sensing the tag. The method comprises determining, based on individual measurements by the ToF camera system of light intensities of at least three light sources of the tag, a first direction vector in the first coordinate system that points from a center point of the tag to the optical center of the ToF camera system. Further, the method comprises determining, based on parameters of the ToF camera system and pixel positions of pixels of an image sensor of the ToF camera system that captured the at least three light sources in the individual measurements of the light intensities, a second direction vector in the second coordinate system that points from the optical center of the ToF camera system to the center point of the tag. The method additionally comprises determining a first auxiliary point in the first coordinate system based on the first direction vector and the center point of the tag, and determining a second auxiliary point in the second coordinate system based on the second direction vector and the optical center of the ToF camera system. The method further comprises determining the rotation parameters based on the center point of the tag, the optical center of the ToF camera system and at least the first and second auxiliary points.

Another example relates to an apparatus for determining rotation parameters for conversion between a first coordinate system associated with a tag and a second coordinate system associated with a ToF camera system configured for sensing the tag. The apparatus comprises a processing circuit configured to determine, based on individual measurements by the ToF camera system of light intensities of at least three light sources of the tag, a first direction vector in the first coordinate system that points from a center point of the tag to the optical center of the ToF camera system. Further, the processing circuit is configured to determine, based on parameters of the ToF camera system and pixel positions of pixels of an image sensor of the ToF camera system that captured the at least three light sources in the individual measurements of the light intensities, a second direction vector in the second coordinate system that points from the optical center of the ToF camera system to the center point of the tag. The processing circuit is configured to determine a first auxiliary point in the first coordinate system based on the first direction vector and the center point of the tag, and to determine a second auxiliary point in the second coordinate system based on the second direction vector and the optical center of the ToF camera system. Additionally, the processing circuit is configured to determine the rotation parameters based on the center point of the tag, the optical center of the ToF camera system and at least the first and second auxiliary points.

A further example relates to a method for determining translation and rotation parameters for conversion between a third coordinate system and a second coordinate system associated with a ToF camera system. The method comprises determining first auxiliary rotation parameters for conversion between a first coordinate system associated with a tag sensed by the ToF camera system and the second coordinate system according to the method for determining rotation parameters as described herein. Further, the method comprises determining first auxiliary translation parameters for conversion between the first coordinate system and the second coordinate system based on one or more ToF depth measurements of the tag. The method comprises determining the rotation parameters based on a combination of the first auxiliary rotation parameters and second auxiliary rotation parameters for conversion between the first coordinate system and the third coordinate system. Additionally, the method comprises determining the translation parameters based on a combination of the first auxiliary translation parameters and second auxiliary translation parameters for conversion between the first coordinate system relative to the third coordinate system.

A still further example relates to an apparatus for determining translation and rotation parameters for conversion between a third coordinate system and a second coordinate system associated with a ToF camera system. The apparatus comprises a processing circuit configured to determine first auxiliary rotation parameters for conversion between a first coordinate system associated with a tag sensed by the ToF camera system and the second coordinate system according to the method for determining rotation parameters as described herein. Further, the processing circuit is configured to determine first auxiliary translation parameters for conversion between the first coordinate system and the second coordinate system based on one or more ToF depth measurements of the tag. The processing circuit is configured to determine the rotation parameters based on a combination of the first auxiliary rotation parameters and second auxiliary rotation parameters for conversion between the first coordinate system and the third coordinate system. Additionally, the processing circuit is configured to determine the translation parameters based on a combination of the first auxiliary translation parameters and second auxiliary translation parameters for conversion between the first coordinate system and the third coordinate system.

An example relates to a tag for ToF applications. The tag comprises at least three light sources configured to controllably emit light and a light detector configured to receive one or more modulated light signals from a ToF camera system. Further, the tag comprises a processing circuit configured to determine one or more time periods in which the ToF camera system is sensitive for light reception. The processing circuit is additionally configured to control the at least three light sources to sequentially and individually emit light according to a predefined lighting pattern during the one or more time periods.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a", "an" and "the" is used and using only a single element is neither explicitly nor implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
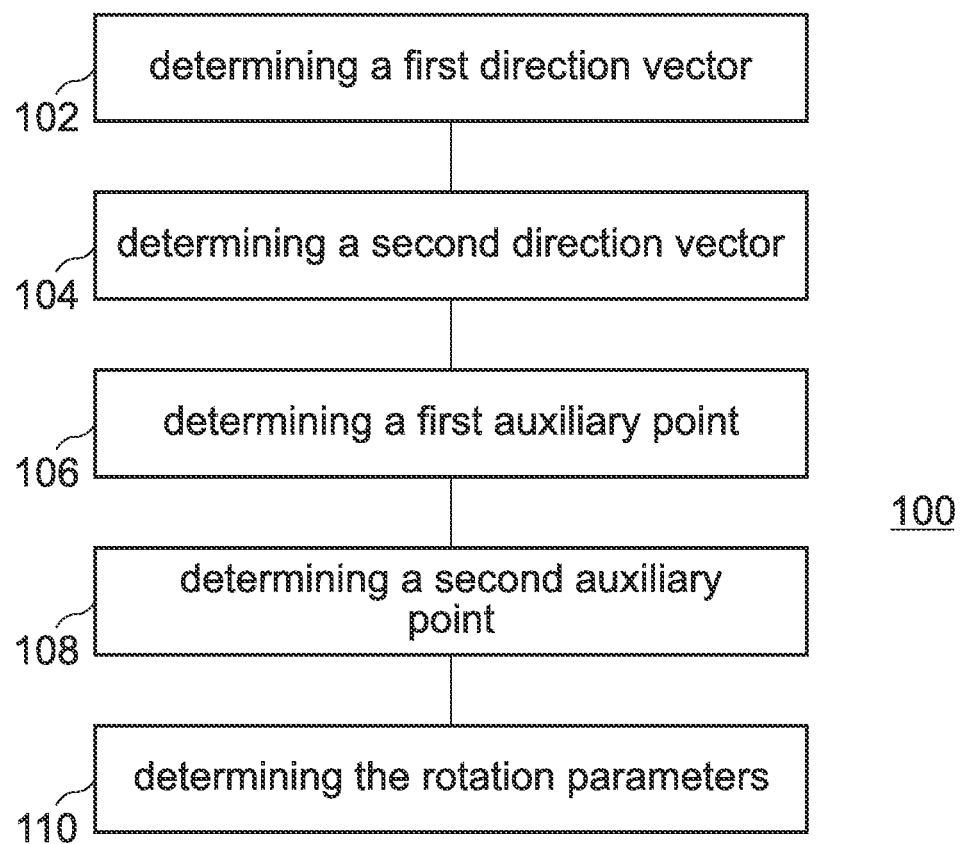
FIG. 1 illustrates a flowchart of an example of a method for determining rotation parameters for conversion between a first coordinate system associated with a tag and a second coordinate system associated with a ToF camera system.

FIG. 1 illustrates a flowchart of a method 100 for determining rotation parameters for conversion (transformation) between a first coordinate system associated with a tag and a second coordinate system associated with a ToF camera system configured for sensing the tag.

Figure 2:
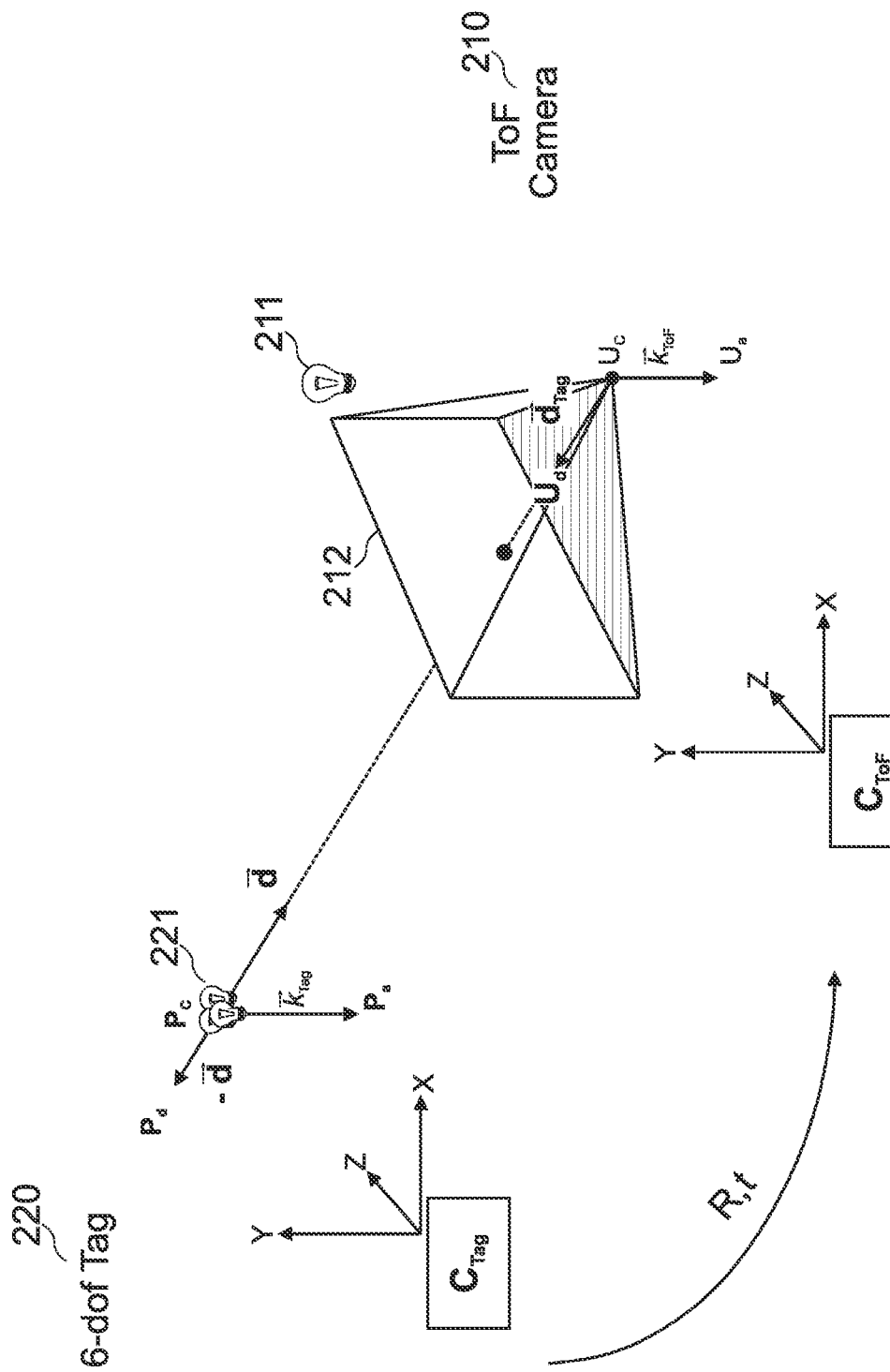
FIG. 2 illustrates an example of a scene comprising a tag and a ToF camera system.

An exemplary scene with a ToF camera system 210 and a tag 220 is schematically illustrated in FIG. 2. The ToF camera system 210 comprises an illumination element 211 for illuminating the scene with modulated light (e.g. infrared light) and a light capturing element 212 for receiving light from the scene. The tag 220 is an electronic device that comprises at least three light sources 221 (e.g. Light-Emitting Diodes, LEDs, or Vertical-Cavity Surface-Emitting Lasers, VCSELs) for emitting light that can be detected by the ToF camera system 210 (e.g. infrared light). The ToF camera system 210 and the tag 220 may optionally comprise further elements, which are not illustrated in FIG. 2 for reasons of simplicity.

Each of the ToF camera system 210 and the tag 220 uses a dedicated coordinate system for describing points in the scene. The tag 220 uses the first coordinate system $C_{Tag}$, whereas the ToF camera system 210 uses the second coordinate camera system $C_{ToF}$. In other words, the first coordinate system $C_{Tag}$ is associated with the tag 220 and the second coordinate system $C_{ToF}$ is associated with the ToF camera system 210. The first and second coordinate systems $C_{Tag}$ and $C_{ToF}$ may be rotated and displaced with respect to each other. For converting (transforming) a point in one of the first and second coordinate systems $C_{Tag}$ and $C_{ToF}$ to a corresponding point in the other one of the first and second coordinate systems $C_{Tag}$ and $C_{ToF}$, rotation parameters and translation parameters describing the relation between the first and second coordinate systems $C_{Tag}$ and $C_{ToF}$ are used. In particular, the rotation parameters allow to compensate for the rotatory displacements of the first and second coordinate systems $C_{Tag}$ and $C_{ToF}$ (i.e. the different orientations of the coordinate systems), whereas the translation parameters allow to compensate for the translatory displacement between the first and second coordinate systems $C_{Tag}$ and $C_{ToF}$.

Referring back to FIG. 1, method 100 comprises determining 102 a first direction vector $\vec{d}$ in the first coordinate system $C_{Tag}$ that points from a center point $P_C$ of the tag 220 to the optical center $U_C$ of the ToF camera system 210. The first direction vector $\vec{d}$ is determined based on individual measurements by the ToF camera system 210 of light intensities of the at least three light sources 221 of the tag 220.

The center point $P_C$ of the tag 220 is a point of the tag 220 around which the at least three light sources 221 are arranged in a circular pattern. As indicated in FIG. 2, the light capturing element 212 of the ToF camera system 210 may be understood or modelled as a pinhole camera. Therefore, the optical center $U_C$ of the ToF camera system 210 may be understood as the center of projection or optical center of the ToF camera system 210. The optical center $U_C$ of the ToF camera system 210 may also be referred to as "lens center" of the ToF camera system 210.

As described above, the ToF camera system 210 measures the individual light intensities of the at least three light sources 221 of the tag 220. The amount of light arriving at the ToF camera system 210 from each of the at least three light sources 221 depends on the orientation of the respective light source to the ToF camera system 210. In other words, for different orientations of the tag 220 relative to the ToF camera system 210, the ToF camera system 210 senses different light intensities for the individual light sources of the at least three light sources 221. Accordingly, the orientation of the tag 220 as represented by the first direction vector $\vec{d}$ may be determined from the measured light intensities of the at least three light sources 221.

For measuring the light intensities, the ToF camera system 210 may, e.g., capture gray-scale images without prior illumination of the scene. Since the tag 220 activates only one of the at least three light sources 221 at a time, only a single light source out of the at least three light sources 221 is visible in each image. However, the method 100 is not limited to capturing gray scale images of the light source. In some examples, the ToF camera system may individually measure the light intensities of the at least three light sources 221 using phase images taken by the ToF camera system 210 for one or more ToF depth measurements. The individual light intensities of the at least three light sources 221 may alternatively be measured using different approaches/techniques.

For example, a pixel reference signal for a pixel of the light capturing element 212 may be set to a constant value so that only one capacitor of the pixel receives charge generated at the pixel due to the incoming light of the active light source of the at least three light sources 221. Accordingly, the light intensity for the active light source may be determined using a single image captured by the ToF camera system.

In another example, the active light source of the at least three light sources 221 may emit constant light and the size of the projected light source on the pixel array of the light capturing element 212 may be measured via the number of pixels measuring the projected light source. The light intensity may be determined by thresholding, i.e. counting the number of pixels above a threshold value.

In a further example, the illumination element 211 may emit light for depth sensing (imaging). Further, the active light source may be modulated at a frequency (substantially) similar to the frequency of the pixel reference signal for a pixel of the light capturing element 212. The light intensity may then be measured from a single phase image captured by the ToF camera system (e.g. a single phase-image out of a series of phase images captured for depth sensing). The frequency difference between the light source and the ToF camera system as well as the current phase of the light source may be determined by the ToF camera system in a synchronization or calibration phase. For each light source, the pixel reference signal is shifted by a predetermined phase shift (e.g. 90°). Since each phase image is captured at a known time instant (i.e. it has a known time stamp), it is known at the ToF camera system which phase the light signal of the respective light source exhibits at each captured phase image (e.g. based on the measured frequency difference and the last phase difference). Accordingly, the current phase of the light source's light may be compared to the expected phase for determining the light intensity of the light source.

In a still further example, multiple phase images may be taken for the active light source of the at least three light sources 221, if the light emission by the light source is modulated at a frequency (substantially) similar to a modulation frequency used by the ToF camera system (e.g. the active light source may be turned on and off at the frequency of the pixel reference signal). Hence, the ToF camera system may capture intensities like in classic intensity images by capturing, e.g., four phase images with equidistant phase offset (e.g. 0°, 90°, 180° and 270°).

Further, method 100 comprises determining 104 a second direction vector $\vec{d}_{Tag}$ in the second coordinate system $C_{TOF}$ that points from the optical center $U_C$ of the ToF camera system 210 to the center point $P_C$ of the tag 220. The second direction vector $\vec{d}_{Tag}$ is determined based on parameters of the ToF camera system 210 (e.g. focal length, distortion, etc.) and pixel positions of pixels of an image sensor of the ToF camera system 210 that captured the at least three light sources 221 in the individual measurements of the light intensities. In some examples, sub-pixel estimation methods may further be used to improve the precision. Accordingly, the pixel position may in some examples be a non-discrete value. The parameters of the ToF camera system 210 are parameters that influence/affect the projection of the at least three light sources onto the image sensor of the ToF camera system 210. Together with the pixel positions of the pixels on which the respective light source of the at least three light sources 221 is projected, a direction vector that points in the opposite direction as the first direction vector a is determined (e.g. calculated). In some examples, the first and second direction vectors a and $\vec{d}_{Tag}$ may be normalized.

The first and second direction vectors $\vec{d}$ and $\vec{d}_{Tag}$ are used for determining auxiliary points. In particular, method 100 additionally comprises determining 106 a first auxiliary point $P_d$ in the first coordinate system $C_{Tag}$ based on the first direction vector $\vec{d}$ and the center point $P_C$ of the tag 220. For example, the first auxiliary point $P_d$ may be determined as follows:

$$P_d = P_C - \vec{d} \qquad (1)$$

Similarly, method 100 comprises determining 108 a second auxiliary point $U_d$ in the second coordinate system $C_{ToF}$ based on the second direction vector $\vec{d}_{Tag}$ and the optical center $U_C$ of the ToF camera system 210. For example, the second auxiliary point $U_d$ may be determined as follows:

$$U_d = U_C + \vec{d}_{Tag} \qquad (2)$$

As can be seen from FIG. 2, the first auxiliary point $P_d$ has the same relation to the center point $P_C$ of the tag 220 as the second auxiliary point $U_d$ to the optical center $U_C$ of the ToF camera system 210. The first and second auxiliary points $P_d$ and $U_d$ may be used together with the center point $P_C$ of the tag 220 and the optical center $U_C$ of the ToF camera system 210 for determining the rotation parameters. Hence, method 100 further comprises determining 110 the rotation parameters based on the center point $P_C$ of the tag 220, the optical center $U_C$ of the ToF camera system 210 and at least the first and second auxiliary points $P_d$ and $U_d$.

The above points in both coordinate systems $C_{Tag}$ and $C_{ToF}$ may be combined in many different ways for determining rotation parameters that enable to convert a point in one of the first and second coordinate systems $C_{Tag}$ and $C_{ToF}$ to a corresponding point in the other one of the first and second coordinate systems $C_{Tag}$ and $C_{ToF}$. For example, the rotation parameters may be determined using Singular Value Decomposition (SVD). Alternatively, the rotation parameters may be determined based on a determination of an eigensystem or a largest eigenvector of a matrix derived from the points in the first and second coordinate systems $C_{Tag}$ and $C_{ToF}$. However, method 100 is not limited to the above mentioned options for determining the rotation parameters. In general, any suitable method for determining a rotation transformation between two sets of points may be used.

The method 100, hence, allows to determine rotation parameters that enable to convert a point in one of the first and second coordinate systems $C_{Tag}$ and $C_{ToF}$ to a corresponding point in the other one of the first and second coordinate systems $C_{Tag}$ and $C_{ToF}$. The rotation parameters may be used to localize the ToF camera system 210 with respect to the tag 200. For example, translation parameters may additionally be determined according to known methods so that a point in the first coordinate systems $C_{Tag}$ may be converted (transformed) to a corresponding point in the second coordinate systems $C_{ToF}$, and vice versa, using the rotation parameters and the translation parameters. For example, the rotation parameters may be matrix elements of a rotation matrix R and the translation parameters may be elements of a translation vector t. However, method 100 is not limited to determining matrix elements of a rotation matrix R. The rotation parameters may be parameters or elements of any suitable three-dimensional rotation.

In some examples, method 100 may further comprise determining additional auxiliary points for the determination of the rotation parameters. For example, method 100 may additionally comprise determining a third auxiliary point $P_a$ in the first coordinate system $C_{Tag}$ based on the center point $P_C$ of the tag 220 and a third direction vector $\vec{k}_{Tag}$ pointing from the center point $P_C$ of the tag 220 to the earth's center of gravity. The third auxiliary point $P_a$ may be determined as follows:

$$P_a = P_C + \vec{k}_{Tag} \qquad (3)$$

Similarly, method 100 may comprise determining a fourth auxiliary point $U_a$ in the second coordinate system $C_{ToF}$ based on the optical center $U_C$ of the ToF camera system 210 and a fourth direction vector $\vec{k}_{ToF}$ pointing from the optical center $U_C$ of the ToF camera system 210 to the earth's center of gravity. The fourth auxiliary point $U_a$ may be determined as follows:

$$U_a = U_C + \vec{k}_{ToF} \qquad (4)$$

The (e.g. normalized) third and fourth direction vectors $\vec{k}_{Tag}$ and $\vec{k}_{ToF}$ point to equivalent directions. Accordingly, the third auxiliary point $P_a$ has the same relation to the center point $P_C$ of the tag 220 as the fourth auxiliary point $U_a$ to the optical center $U_C$ of the ToF camera system 210. Hence, the third and fourth auxiliary points $P_a$ and $U_a$ may be used for determining the rotation parameters. In other words, determining 110 the rotation parameters may further be based on the third and fourth auxiliary points $P_a$ and $U_a$.

The pieces of information related the tag 220 may be a priori knowledge or be received from the tag 220. For example, method 100 may comprise receiving, at the ToF camera system 210, information about the third direction vector $\vec{k}_{Tag}$ from the tag 220. For example, the tag 220 may emit modulated light via the at least three light sources or emit one or more radio frequency signals via a radio frequency transmitter (not illustrated) that represent the information about the third direction vector $\vec{k}_{Tag}$. Accordingly, the light capture element 212 or a radio frequency receiver (not illustrated) of the ToF camera system 210 may receive the modulated light or the one or more radio frequency signals from the tag 220. Similarly, method 100 may comprise receiving, at the ToF camera system 210, information related to the center point $P_C$ of the tag 220 from the tag 220.

Alternatively, if the pieces of information related the tag 220 are a priori knowledge, method 100 may comprise reading a priori information about the third direction vector $\vec{k}_{Tag}$ from a data storage (not illustrated) of the ToF camera system 210. Similarly, method 100 may comprise reading a priori information related to the center point $P_C$ of the tag 220 from the data storage of the ToF camera system 210.

For example, if the tag 220 is dynamically mounted (i.e. it may be moved), the tag 220 may comprise an accelerometer for measuring the third direction vector $\vec{k}_{Tag}$ and transmit the measurement value to the ToF camera 210. If the tag 220 is rigidly mounted, the third direction vector $\vec{k}_{Tag}$ may be set to constant value and, e.g., be stored in a data storage of the tag 220 for transmission to the ToF camera 210 or be stored in the data storage of the ToF camera 210.

Similarly, method 100 may comprise determining the fourth direction vector $\vec{k}_{ToF}$ using an accelerometer of the ToF camera system 210. For example, if the ToF camera system 210 is a smartphone or a head-mounted augmented reality device, an already available accelerometer of the system may be used for determining the fourth direction vector $\vec{k}_{ToF}$ at high update rates.

In addition to the above mentioned pieces of information/data, the tag 220 may emit further data such as, e.g., an identification number, sensor data or geometry. This data may, e.g., be used in an augmented reality application for displaying an object in the user's viewport. As described above, the tag 220 may emit the data by radio frequency waves or modulated light. Accordingly, the method 100 may in some examples comprise determining data emitted by the tag 20 via a modulated light signal based on phase images taken by the ToF camera system 210 for one or more ToF depth measurements.

In some examples, the ToF camera system 210 may transmit one or more radio frequency signals for transmitting data to the tag 220. For example, the ToF camera system 210 may transmit synchronization information to the tag 220 that enables the tag 220 to active the light sources at timer periods the ToF camera system 210 is sensitive for light reception.

In the following, an example for determining 102 the first direction vector $\vec{d}$ in the first coordinate system $C_{Tag}$ is described with reference to FIGS. 3 and 4. However, it is to be noted that method 100 is not limited to the following example and that other approaches (e.g. as described above) may be used.

Figure 3:
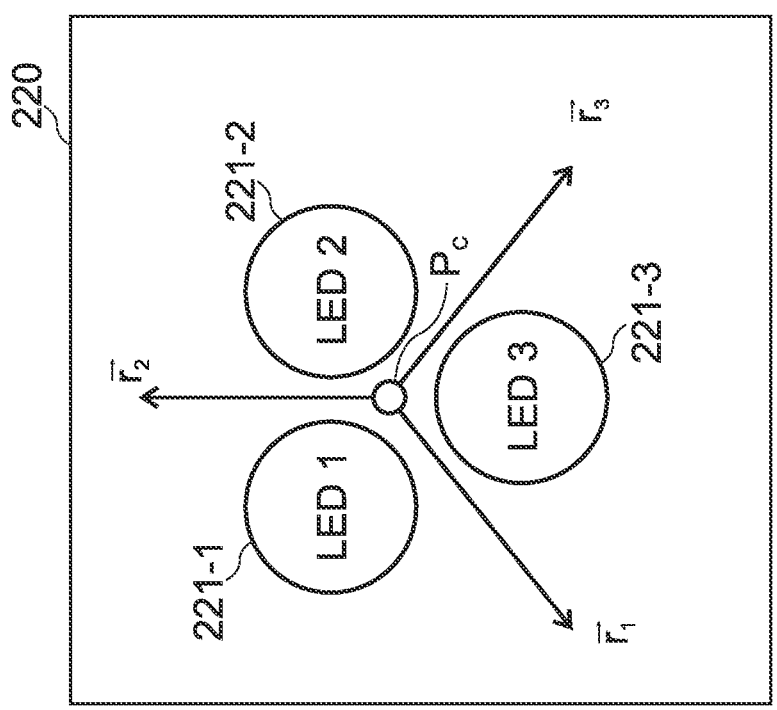
FIG. 3 illustrates an example of an arrangement of light sources at the tag.

FIG. 3 illustrates a schematic top view of the tag 220 holding three light sources 221-1, 221-2 and 221-3 (e.g. implemented as LEDs). Additionally, FIG. 4 illustrates a perspective view of the tag 220. The three light sources 221-1, 221-2 and 221-3 are arranged in circular pattern around the center point $P_C$ of the tag 220. Although the following description refers to three light sources, it is to be noted that the approach may accordingly be used for n>3 light sources.

Figure 4:
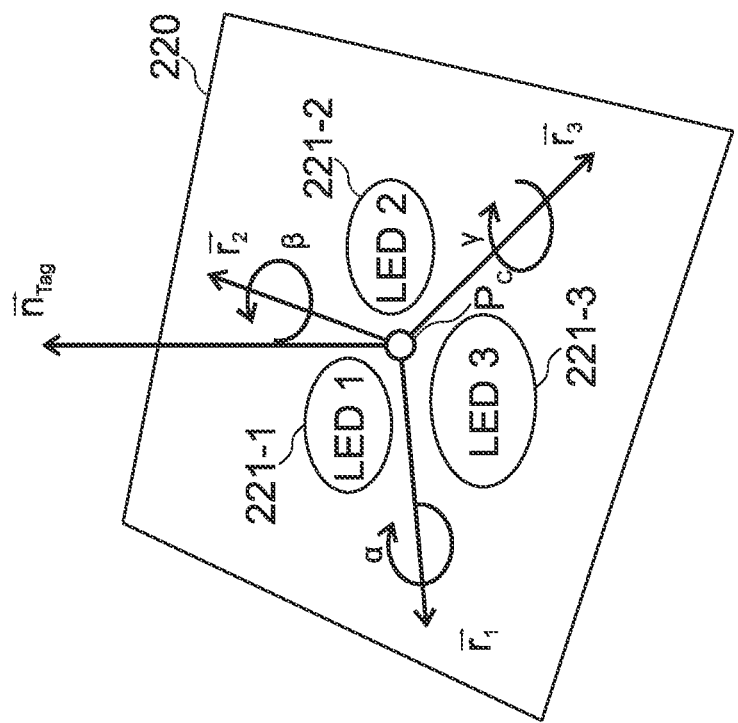
FIG. 4 illustrates a perspective view of the arrangement illustrated in FIG. 3.

In addition to the three light sources 221-1, 221-2 and 221-3, three imaginary rotational axes $\vec{r}_1$, $\vec{r}_2$ and $\vec{r}_3$ are illustrated in FIGS. 3 and 4 (n>3 rotational axes are to be used for n>3 light sources). The three rotational axes $\vec{r}_1$, $\vec{r}_2$ and $\vec{r}_3$ intersect an imaginary normal vector $\vec{n}_{Tag}$ of the tag in the center point $P_C$ of the tag 220. The normal vector $\vec{n}_{Tag}$ is perpendicular to the surface of the tag 220. The three rotational axes $\vec{r}_1$, $\vec{r}_2$ and $\vec{r}_3$ are perpendicular to the normal vector $\vec{n}_{Tag}$. In other words, the rotational axes $\vec{r}_1$, $\vec{r}_2$ and $\vec{r}_3$ extend in a plane defined by the surface of the tag 220.

The first direction vector $\vec{d}$ may be understood as a rotation of the normal vector $\vec{n}_{Tag}$ about at least two of the rotational axes $\vec{r}_1$, $\vec{r}_2$ and $\vec{r}_3$. The rotation of the normal vector $\vec{n}_{Tag}$ about the rotational axes $\vec{r}_1$, $\vec{r}_2$ and $\vec{r}_3$ may be described by rotation angles α, β and γ.

Each of the rotation angles α, β and γ is determined by the light intensities of its neighboring light sources. For example, the rotation angle α is determined by the light intensities of the light sources 221-1 and 221-3. The absolute values of the measured light intensities of the light sources 221-1, 221-2 and 221-3 depend on the distance between the tag 220 and the ToF camera system 210. Therefore, the ratios of the light intensities may be used for determining the rotation angles α, β and γ.

For example, for determining the rotation angle α, the ratio $u_1$ of the light intensities $L_1$ and $L_3$ of the light sources 221-1 and 221-3 is determined:

$$u_1 = \frac{L_1}{L_3} \quad (5)$$

For deriving the rotation angle α from the ratio $u_1$, a ratio-angle mapping function $h(u_i)$ is used:

$$\alpha = h(u_1) \quad (6)$$

The ratio-angle mapping function $h(u_i)$ may in some examples be determined analytically (e.g. by neglecting some factors that influence the ratio-angle mapping function $h(u_i)$). In some examples, a manifold of factors may influence the ratio-angle mapping function $h(u_i)$ so that no analytical description of the ratio-angle mapping function $h(u_i)$ is possible. In such cases, the ratio-angle mapping function $h(u_i)$ may, e.g., be based on a (optical) simulation or be based on a calibration of the ToF camera system 210. The (optical) simulation leads to a simulated image of the tag 220. Similarly, the calibration leads to a reference image. By making multiple images at different known rotation angles of the tag 220 relative to the ToF camera system 210, the light intensities for different relative orientations between the tag 220 and the ToF camera system 210 may be determined. Accordingly, corresponding light intensity ratios for the light sources may be determined for the different relative orientations. The determined light intensity ratios may be used as a translation function which allow to look up a certain measured ratio and get the corresponding rotation angle. For example, the determined light intensity ratios may be stored in a table. Optionally, the determined light intensity ratios may be interpolated to increase the precision. The above process for determining the light intensity ratios may be done for each rotation axis to obtain the ratio-angle mapping function $h(u_i)$.

Again, it is to be noted that the above described techniques for determining the ratio-angle mapping function $h(u_i)$ are merely exemplary and not limiting method 100. Various other approaches may be used for determining the ratio-angle mapping function $h(u_i)$. For example, the ratio-angle mapping function $h(u_i)$ may be determined without simulations or calibrations of the ToF camera system 210.

Similarly, the other rotation angles β and γ may be determined based on the respective light intensities and the ratio-angle mapping function $h(u_i)$.

In summarizing the above, determining 102 the first direction vector $\vec{d}$ may comprise determining light intensity ratios for at least two different pairs of the at least three light sources 221-1, 221-2, 221-3 and determining rotation angles for the first direction vector $\vec{d}$ with respect to the rotational axes extending between the at least two pairs of light sources based on a ratio-angle mapping function $h(u_i)$ and the light intensity ratios for the at least two pairs of light sources. The at least two rotation angles are used for rotating the normal vector $\vec{n}_{Tag}$ in order to obtain the first direction vector $\vec{d}$.

For example, determining the first direction vector $\vec{d}$ based on the normal vector $\vec{n}_{Tag}$ and the at least two rotation angles may comprise determining auxiliary rotation matrices for each rotation angle based on the rotation angle and the associated rotation axis. For example, a first auxiliary rotation matrix $R_\alpha$ for the rotation angle α may be determined based on the associated rotation axis $\vec{r}_1$. Determining a rotation matrix from an axis and an angle is known as such. Therefore, further details of the determination of a rotation matrix from an axis and an angle are omitted.

The at least two auxiliary rotation matrices may be applied to the normal vector $\vec{n}_{Tag}$ for determining the first direction vector $\vec{d}$. For example, determining the first direction vector $\vec{d}$ based on the normal vector $\vec{n}_{Tag}$ and the at least two rotation angles may comprise multiplying the normal vector $\vec{n}_{Tag}$ by the auxiliary rotation matrices for obtaining the first direction vector.

If, e.g., the rotation matrices $R_\alpha$ and $R_\beta$ for the rotation angles $\alpha$ and $\beta$ are determined, the first direction vector $\vec{d}$ may be determined as follows via matrix multiplication:

$$\vec{d} = R_\alpha \cdot R_\beta \cdot \vec{n}_{Tag} \qquad (7)$$

Optionally, all possible combinations of rotation axes may be used to derive first direction vector $\vec{d}$. For example, three different combinations are possible for three light sources. The result is then an averaged first direction vector $\vec{d}$ with improved accuracy.

As described above, the ToF camera system 210 may individually measure the light intensities of the at least three light sources of the tag 220 or determine data emitted by the tag 220 via modulated light using phase images taken by the ToF camera system 210 for one or more ToF depth measurements. In the following some exemplary ToF illumination patterns are described in connection with FIGS. 5 to 10. However, it is to be noted that these patterns are merely exemplary and that also other patterns may be used.

The ToF camera system 210 may, e.g., measure the distance and the rotation to the tag 220. Optionally it may further receive information from the tag 220 such as the identity of the tag 220. For example, the information may be used to describe a three-dimensional object that is later rendered at the position of the tag 220 into the user's viewport.

While the ToF camera system 210 senses the distance to the tag 220, the tag 220 should not emit light in order to not impair the ToF depth measurement. Further, for measuring the orientation of the tag 220, the ToF camera system 210 makes an image for each activated light source individually.

Figure 5:
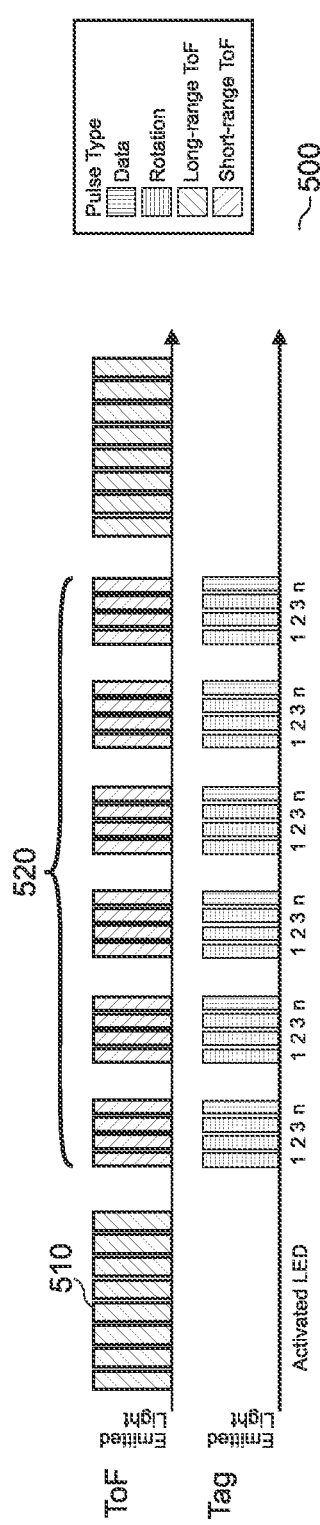
FIG. 5 illustrates a first example of a ToF illumination pattern.

FIG. 5 illustrates a first ToF illumination pattern 500 which fulfills these criteria. Initially, the distance to the tag 220 over a long-rage is measured using a sequence 510 of eight phase images. For example, the first ToF illumination pattern 500 may be repeated five times per second to obtain a long rage distance measurement at 5 Hz. At the same time it provides close distance depth measurements (i.e. a close distance depth stream) at 30 Hz via the sequence 520 of six consecutive short-range ToF measurements. For each of the first three phase images in each of the six close distance depth measurements, a different one of the three light sources is activated by the tag so that each of the resulting phase images contains one of the three light sources. The last phase image in each of the close distance depth measurements is used to optically transmit data from the tag 220 to the ToF camera system 210. For example, the data may be transmitted via on-off keying, phase-shift keying or amplitude keying. The first ToF illumination pattern 500 may be beneficial since it does not alter the regular behavior of the ToF camera system 210, so that compatibility to other ToF applications is ensured.

Figure 6:
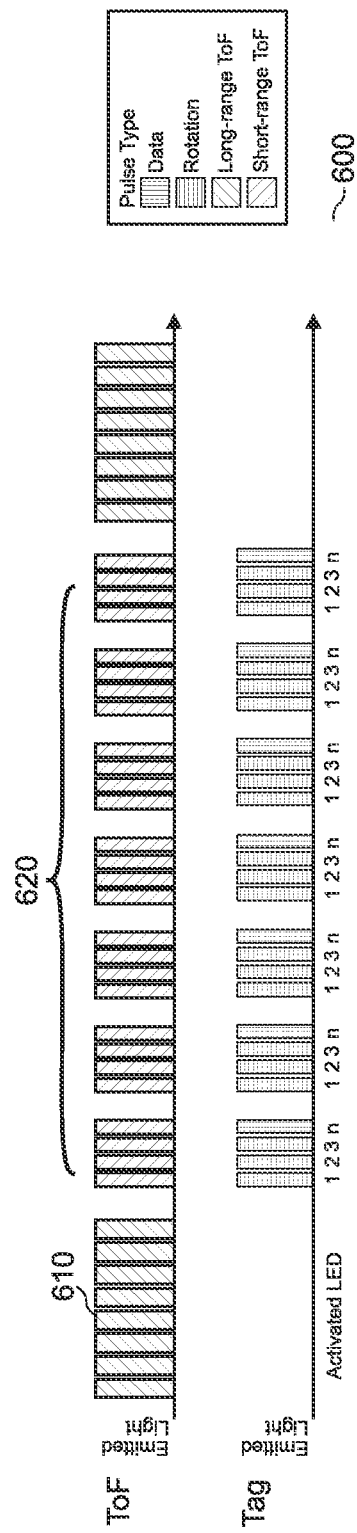
FIG. 6 illustrates a second example of a ToF illumination pattern.

FIG. 6 illustrates a second ToF illumination pattern 600 using a sequence 620 of seven consecutive short-range ToF measurements after the sequence 610 of eight phase images for the long rage measurement. That is, more short-range ToF measurements between the eight phase long-range ToF measurements may be used. The tag 220 emits light during each of the short-range ToF measurements.

Figure 7:
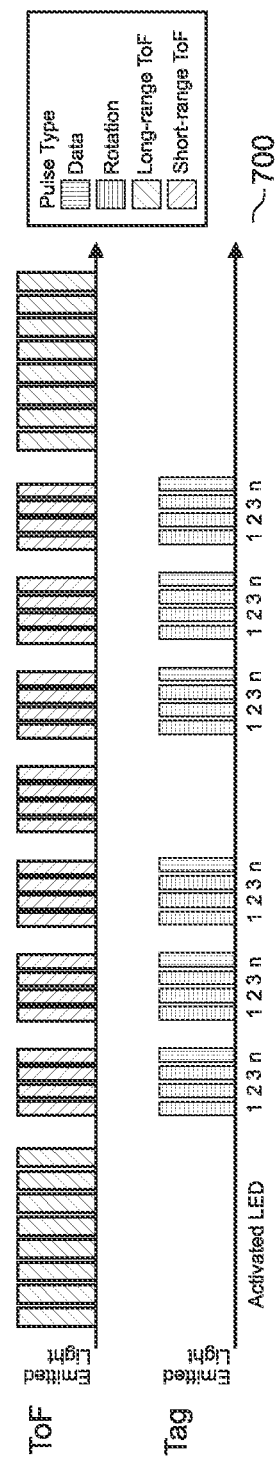
FIG. 7 illustrates a third example of a ToF illumination pattern.

In FIG. 7, a third ToF illumination pattern 700 illustrates. Compared to the second ToF illumination pattern 600, the tag 220 does not illuminate light during the middle short-range ToF measurement. Accordingly, an intermediate short-range ToF depth measurement is feasible, which allows a higher distance update rate.

Figure 8:
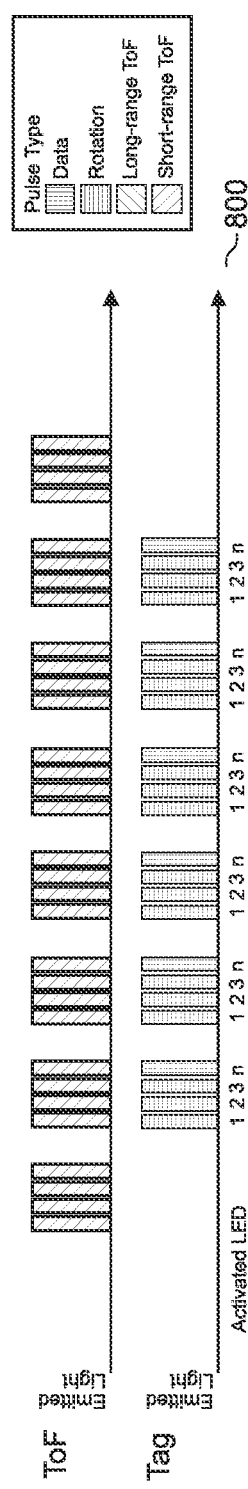
FIG. 8 illustrates a fourth example of a ToF illumination pattern.

FIG. 8 illustrates a fourth ToF illumination pattern 800 using only short-range ToF depth measurements, but no long-range ToF distance measurements.

Figure 9:
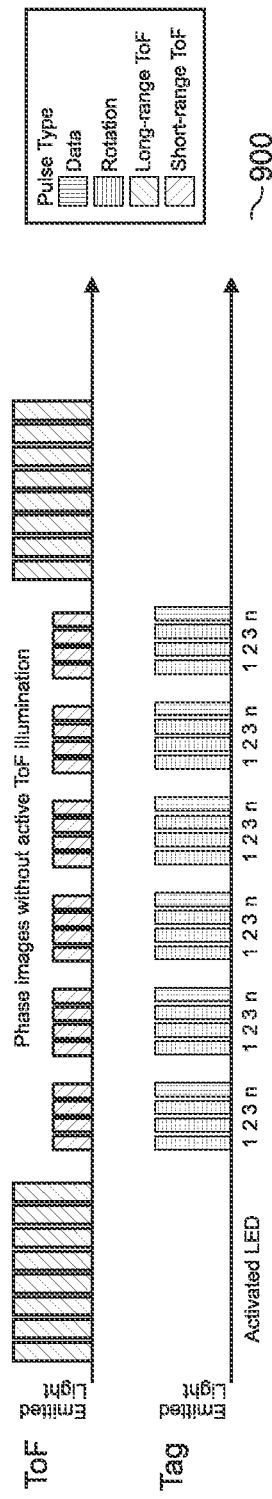
FIG. 9 illustrates a fifth example of a ToF illumination pattern.

Further, FIG. 9 illustrates a fifth ToF illumination pattern 900 using active illumination of the scene only for the long-range ToF measurements. That is, the illumination element of the ToF camera system 210 illuminates the scene only for the long-range ToF measurements used for determining the distance to the tag 220, but not for the short-rang ToF measurements used for determining the orientation of the tag 220 relative to the ToF camera system 210. This may allow to save energy at the ToF camera system 210. The tag 220 may, e.g., synchronize the activation of the light sources based on the light pulses emitted by the ToF camera system 210 for the long-range ToF measurements.

Figure 10:
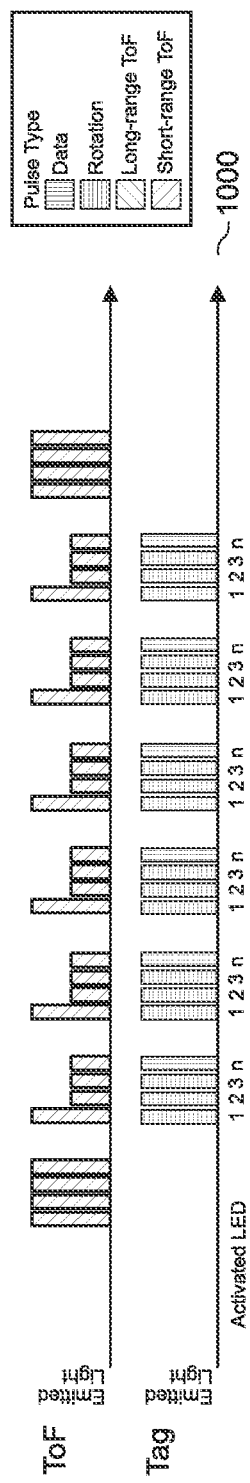
FIG. 10 illustrates a sixth example of a ToF illumination pattern.

FIG. 10 illustrates a sixth ToF illumination pattern 1000 using only short-range ToF depth measurements. Compared to the fourth ToF illumination pattern 800, the illumination element of the ToF camera system 210 illuminates the scene only for the first phase image to aid synchronization for the tag 220.

As said above, the ToF illumination patterns as well as the light source activation patterns may be customized in any way. Therefore, it is to be noted that the above described patterns are merely exemplary and do not limit the proposed method.

Figure 11:
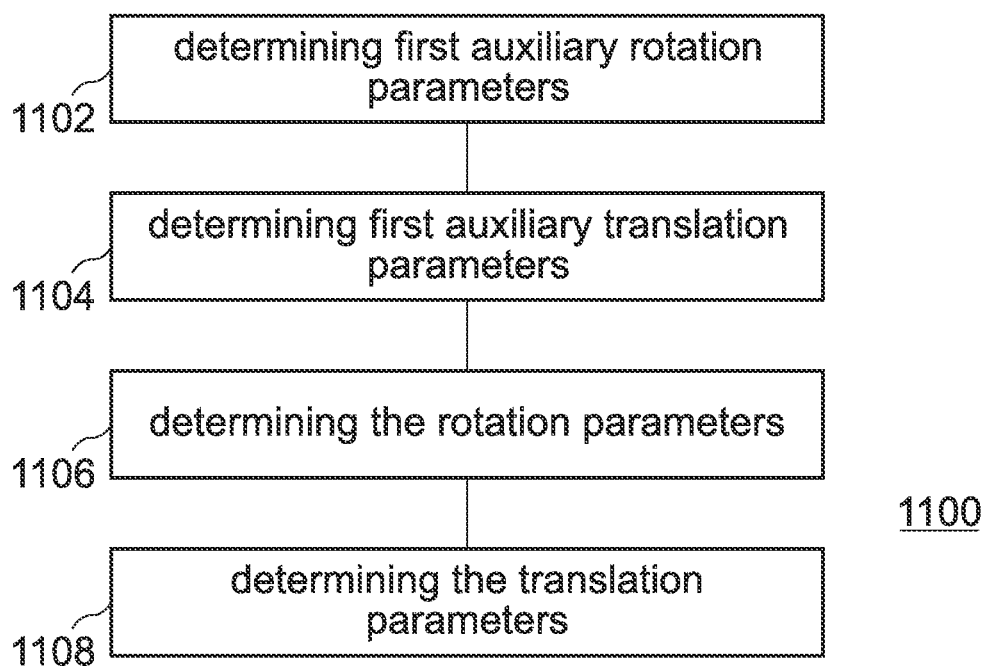
FIG. 11 illustrates a flowchart of an example of a method for determining translation and rotation parameters for conversion between a third coordinate system and a second coordinate system associated with a ToF camera system.

The above described method 100 may further be used to localize a ToF camera system in a meaningful coordinate system such as indoor positioning coordinate system or a motion tracking coordinate system. FIG. 11 illustrates a flowchart of an according method 1100 for determining translation and rotation parameters for conversion between a third coordinate system (e.g. a coordinate system associated to indoor positioning or motion tracking) and a second coordinate system associated with a ToF camera system.

Figure 12:
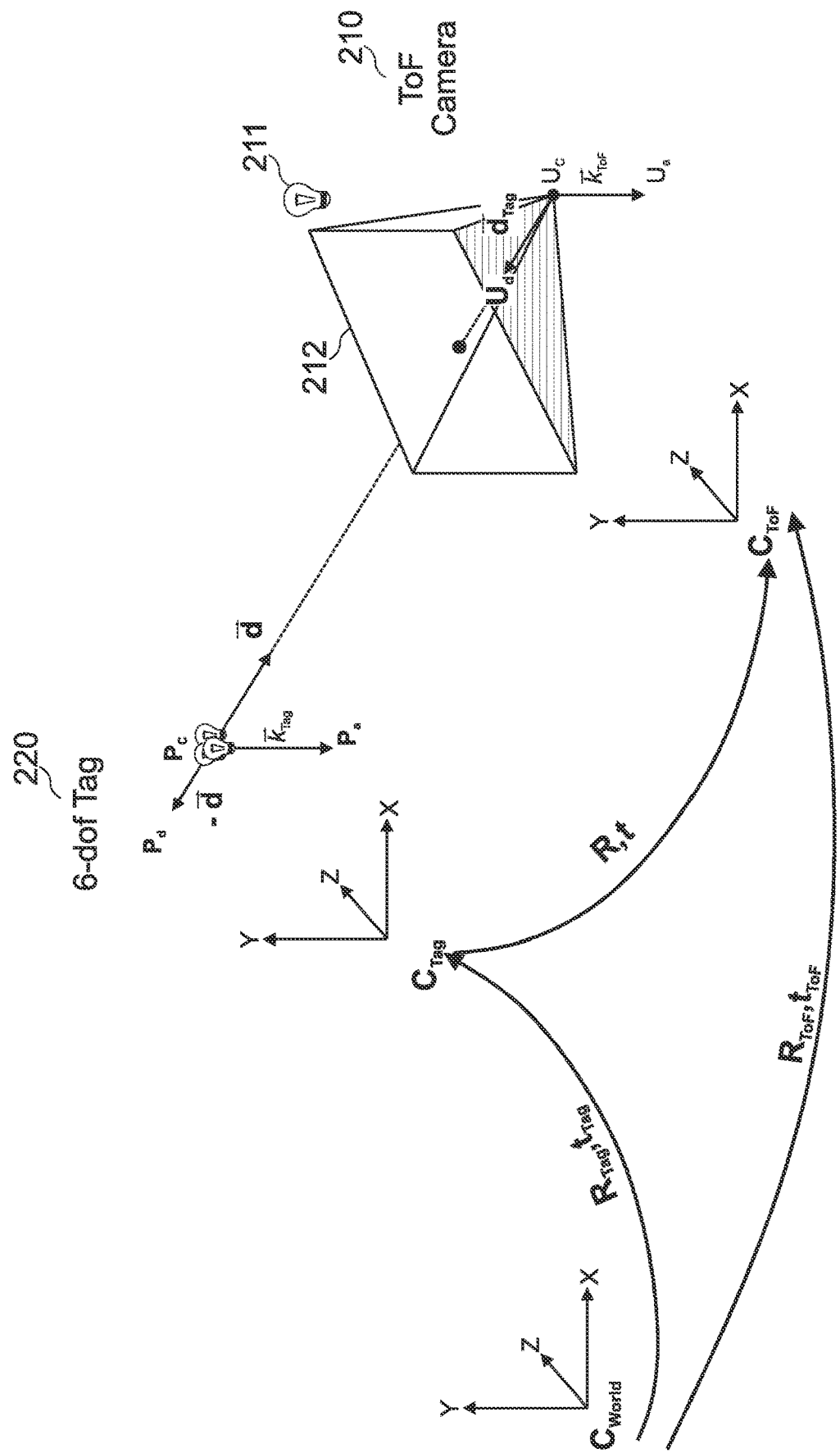
FIG. 12 illustrates another example of a scene comprising a tag and a ToF camera system.

An exemplary scene with a ToF camera system 210 and a tag 220 is schematically illustrated in FIG. 12. Again, each of the ToF camera system 210 and the tag 220 uses a dedicated coordinate system for describing points in the scene. The tag 220 uses the first coordinate system $C_{Tag}$, whereas the ToF camera system 210 uses the second coordinate camera system $C_{ToF}$. However, the ToF camera system 210 wants to localize itself in the third coordinate system $C_{World}$.

Referring back to FIG. 11, method 1100 comprises determining 1102 first auxiliary rotation parameters R for conversion between the first coordinate system $C_{Tag}$ associated with the tag 220 sensed by the ToF camera system 210 and the second coordinate system $C_{ToF}$ according to the method for determining rotation parameters as described herein (e.g. in connection with FIG. 1). By using, e.g., the above described method 100, the first auxiliary rotation parameters R for conversion between the first coordinate system $C_{Tag}$ and the second coordinate system $C_{ToF}$ may be determined.

Further, method 1100 comprises determining 1104 first auxiliary translation parameters t for conversion between the first coordinate system $C_{Tag}$ and the second coordinate system $C_{ToF}$ based on one or more ToF depth measurements of the tag 220 by the ToF camera system 210. The first auxiliary translation parameters t may be determined as described above in connection with FIG. 1.

Method 1100 comprises determining 1106 the rotation parameters $R_{ToF}$ for conversion between the third coordinate system $C_{World}$ and the second coordinate system $C_{ToF}$ based on a combination of the first auxiliary rotation parameters R and second auxiliary rotation parameters $R_{Tag}$ for conversion between the first coordinate system $C_{Tag}$ and the third coordinate system $C_{World}$. In other words, determining 1106 the rotation parameters $R_{ToF}$ for conversion between the third coordinate system $C_{World}$ and the second coordinate system $C_{ToF}$ may be based on a combination of the rotation parameters for conversion between the coordinate systems of the tag 220 and the ToF camera system 210 and the rotation parameters for conversion between the coordinate system of the tag 220 and the third coordinate system $C_{World}$.

Additionally, method 1100 comprises determining the translation parameters $t_{ToF}$ for conversion between the third coordinate system $C_{World}$ and the second coordinate system $C_{ToF}$ based on a combination of the first auxiliary translation parameters t and second auxiliary translation parameters $t_{Tag}$ for conversion between the first coordinate system $C_{Tag}$ and the third coordinate system $C_{World}$. In other words, determining 1108 the translation parameters for conversion between the third coordinate system $C_{World}$ and the second coordinate system $C_{ToF}$ may be based on a combination of the translation parameters for conversion between the coordinate systems of the tag 220 and the ToF camera system 210 and the translation parameters for conversion between the coordinate system of the tag 220 and the third coordinate system $C_{World}$.

For example, the rotation parameters $R_{ToF}$ and the translation parameters $t_{ToF}$ may be calculated as follows:

$$t_{ToF} = t_{Tag} + t \quad (8)$$

$$R_{ToF} = R_{Tag} + R \quad (9)$$

The rotation parameters $R_{ToF}$ may, e.g., be matrix elements of a rotation matrix and the translation parameters $t_{ToF}$ may be elements of a translation vector. However, the rotation parameters and the translation parameters may alternatively be parameters or elements of any other suitable three-dimensional transformation.

By determining the rotation parameters $R_{ToF}$ and the translation parameters $t_{ToF}$ between the coordinate systems $C_{World}$ and $C_{ToF}$, the ToF camera system 210 may localize itself in the third coordinate systems $C_{World}$. For example, the third coordinate systems $C_{World}$ may be a coordinate system for indoor positioning (e.g. in an office building or an airport).

The information about the second auxiliary rotation parameters $R_{Tag}$ and the second auxiliary translation parameters $t_{Tag}$ may be provided by the tag 220. Accordingly, method 1100 may further comprise receiving, at the ToF camera system 210, information (data) about the second auxiliary rotation parameters $R_{Tag}$ and the second auxiliary translation parameters $t_{Tag}$ from the tag 220. As described above, the tag 220 may transmit the information via modulated light or one or more radio frequency signals to the ToF camera system 210. For example, the second auxiliary rotation parameters $R_{Tag}$ and the second auxiliary translation parameters $t_{Tag}$ may be determined during the installation of the tag 220 and be saved in a data storage of the tag 220. As described above, the tag 220 may further transmit other pieces of information (e.g. its identity) to the ToF camera system 210.

Figure 13:
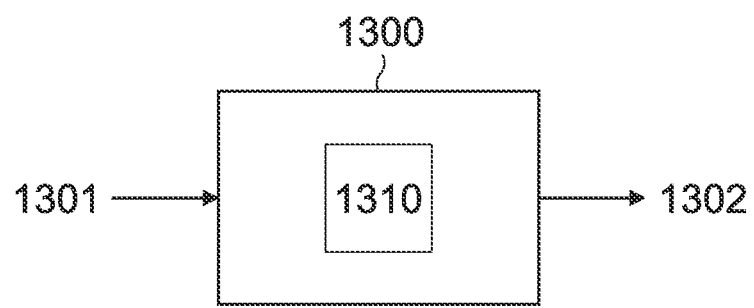
FIG. 13 illustrates an example of an apparatus for performing the methods as described herein.

An example of an apparatus 1300 for performing the proposed methods (e.g. method 100 or method 1100) is further illustrated in FIG. 13. The apparatus 1300 comprises a processing circuit 1310. For example, the processing circuit 1310 may be a single dedicated processor, a single shared processor, or a plurality of individual processors, some of which or all of which may be shared, a digital signal processor (DSP) hardware, an application specific integrated circuit (ASIC) or a field programmable gate array (FPGA). The processing circuit 1310 may optionally be coupled to, e.g., read only memory (ROM) for storing software, random access memory (RAM) and/or non-volatile memory. The apparatus 1300 may further comprise other hardware—conventional and/or custom.

The apparatus 1300 receives input data 1301 such as phase images of the ToF camera system, information (data) about light intensities of the at least three light sources of the sensed tag, information (data) about parameters of the ToF camera system, information (data) about pixel positions of pixels of the image sensor of the ToF camera system that captured the at least three light sources in the individual measurements of the light intensities, information (data) about the third direction vector, information (data) about the fourth direction vector, etc. The processing circuit 1310 processes the input data 1301 according to the above described concepts for determining rotation parameters and optional translation parameters for conversion between different coordinate systems. Accordingly, the apparatus 1300 outputs output data 1302 representing the rotation parameters and optional the translation parameters.

For example, the functionalities of apparatus 1300 may be implemented in an application processor of the ToF camera system.

Figure 14:
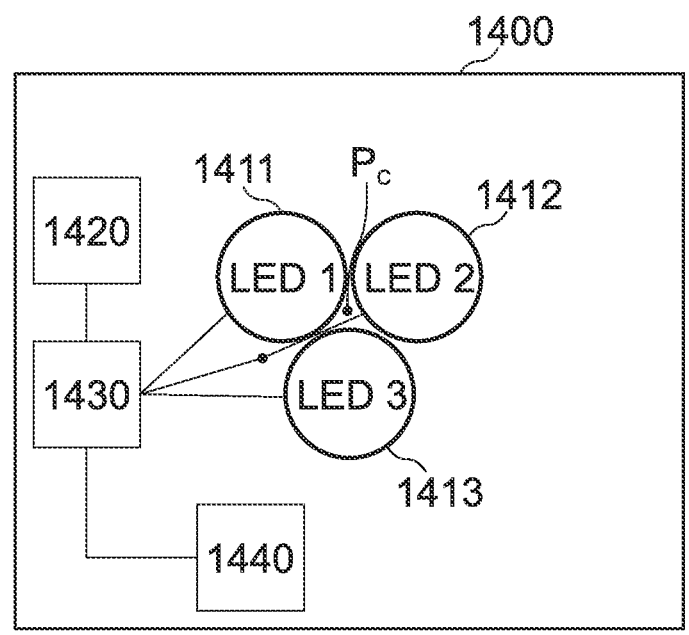
FIG. 14 illustrates an example of a tag for ToF applications.

More details of the tags used for proposed concept are described in the following in connection with FIG. 14, which illustrates a tag 1400 for ToF applications. The tag 1400 is an electronic device comprising at least three light sources 1411, 1412, 1413 configured to controllably emit light. In general, the tag 1400 may comprise any number n≤3 of light sources. The at least three light sources 1411, 1412, 1413 may, e.g., be LED or VCSELs and controllably emit infrared light. However, the at least three light sources 1411, 1412, 1413 may also be implemented in a different manner and emit light other than infrared light. For example, the at least three light sources 1411, 1412, 1413 may emit light at one or more wavelengths in the visible spectrum (e.g. at all visible wavelength in the visible spectrum).

The tag 1400 further comprises a light detector 1420 configured to receive one or more modulated light signals from a ToF camera system that is configured for sensing the tag 1400. For example, the light detector 1420 may be a solar cell, a photo diode, an avalanche photo diode, a single photon avalanche diode or a silicon photomultiplier.

Additionally, the tag 1400 comprises a processing circuit 1430. For example, the processing circuit 1430 may be a single dedicated processor, a single shared processor, or a plurality of individual processors, some of which or all of which may be shared, a DSP hardware, an ASIC or a FPGA. The processing circuit 1430 may optionally be coupled to, e.g., ROM for storing software, RAM and/or non-volatile memory. The apparatus 1400 may further comprise other hardware—conventional and/or custom.

The processing circuit 1430 is configured to determine, based on the one or more modulated light signals received by the light detector 1420 from the ToF camera system, one or more time periods in which the ToF camera system is sensitive for light reception. For example, the ToF camera system may emit light pulses according to one of the illumination patterns illustrated in FIGS. 5 to 10.

In order to enable the ToF camera system to determine the orientation of the tag 1400 relative to the ToF camera system, the processing circuit 1430 is further configured to control the at least three light sources 1411, 1412, 1413 to sequentially and individually emit light according to a predefined lighting pattern during the one or more time periods in which the ToF camera system is sensitive for light reception.

Accordingly, the tag 1400 may enable the ToF camera system to determine its relative orientation to the tag 1400. For example, the tag 1400 may enable the ToF camera system to localize itself as described above in detail.

The light detector 1420 may further be used for receiving data/information from the ToF camera system. For example, the processing circuit 1430 may be further configured to determine data emitted by the ToF camera system based on the one or more modulated light signals received from the ToF camera system. For example, the received light signals may represent control data for synchronizing the light emission of the tag 1400 and the one or more time periods in which the ToF camera system is sensitive for light reception. In other words, the processing circuit 1430 may be further configured to control the at least three light sources 1411, 1412, 1413 to sequentially and individually emit light based on synchronization information derived from the one or more modulated light signals.

Alternatively or additionally, the tag 1400 may communicate via radio frequency signals. Therefore, the tag 1400 may in some examples comprise a radio frequency communication element 1440 such as a radio frequency transmitter, a radio frequency receiver or a radio frequency transceiver. For example, the processing circuit 1430 may be configured to derive the synchronization information from one or more radio frequency signals received by the radio frequency communication element 1440 (which acts as a radio frequency receiver of the tag 1400).

By controlling the at least three light sources 1411, 1412, 1413 based on the synchronization information, the ToF camera system may determine its orientation relative to the tag 1400 in compatibility to regular ToF depth sensing (see e.g. the patterns in FIGS. 5 to 10).

Similarly, the processing circuit 1430 may control the at least three light sources 1411, 1412, 1413 for transmitting data to the ToF camera system. That is, the at least three light sources 1411, 1412, 1413 may be used for optical communication. For example, the processing circuit 1430 may be further configured to control one or more of the at least three light sources 1411, 1412, 1413 to emit light representing data to be transmitted to the ToF camera system during the one or more time periods in which the ToF camera system is sensitive for light reception.

Alternatively or additionally, the processing circuit 1430 may be configured to control the radio frequency communication element 1440 (to act as a radio frequency transmitter of the tag 1400 and) to emit one or more radio frequency signals representing data to be transmitted to the ToF camera system.

For example, the data to be transmitted to the ToF camera system may be an identification number of the tag 1400, sensor data (e.g. of an accelerometer sensing $\vec{K}_{Tag}$ or any other sensor of the tag 1400), geometry, information about rotation or translation parameters for converting the coordinate system of the tag 1400 to another coordinate system (e.g. such as an indoor positioning coordinate system), etc.

The at least three light sources 1411, 1412, 1413 are arranged in circular pattern around the center point $P_C$ of the tag 1400. That is, each of the at least three light sources 1411, 1412, 1413 exhibits substantially the same distance to the center point $P_C$ of the tag 1400.

Figure 15:
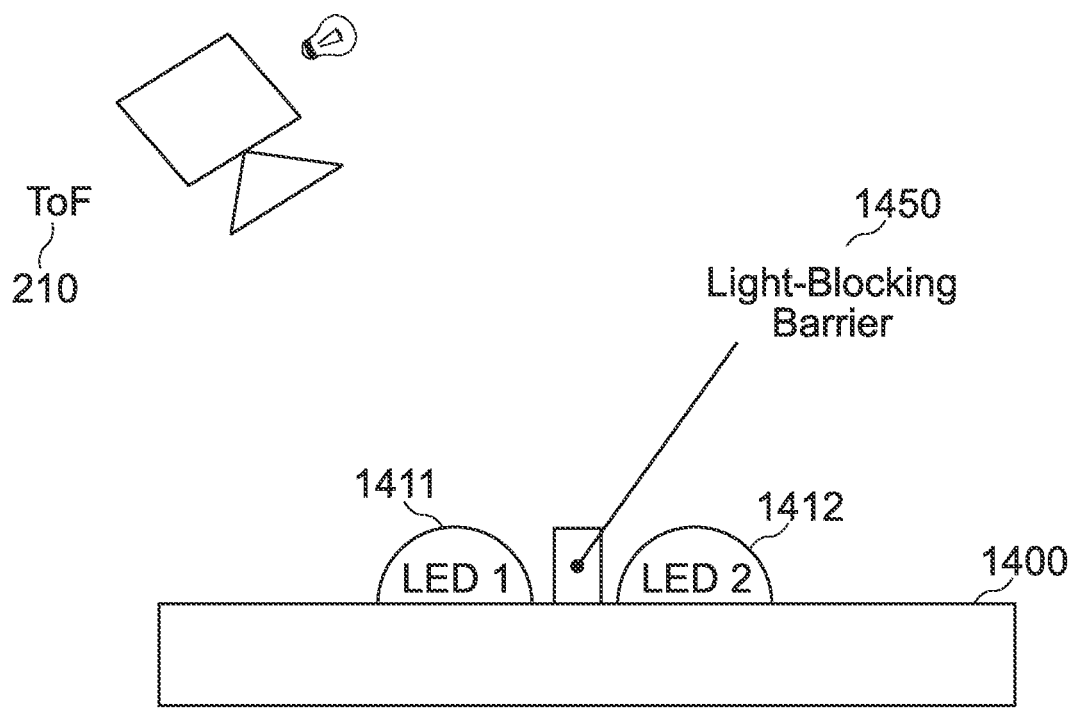
FIG. 15 illustrates another example of a tag for ToF applications.

The at least three light sources 1411, 1412, 1413 exhibit a directional light emission characteristic. Hence, if one of the light sources is sensed at different angles, the amount of light arriving at the ToF camera system varies. As described above, this effect may be used to determine the orientation of the ToF camera system relative to the tag 1400. In order to increase or amplify this characteristic, the at least three light sources 1411, 1412, 1413 may be mounted non-planar. In other words, at least two of the at least three light sources 1411, 1412, 1413 may be tilted with respect to each other so that the at least two light sources emit light in different directions. Alternatively or additionally, a barrier 1450 as illustrated in FIG. 15 may be arranged between two of the at least three light sources 1411, 1412, 1413 such that the barrier 1450 blocks part of the light emitted by each of the two light sources. By mounting barriers between neighboring light sources, the directional light emission characteristic of the light sources may be increased for enabling an increased angle sensitivity of the ToF camera system.

The at least three light sources 1411, 1412, 1413 may be concentrated to a small area. For example a distance to the center point $P_C$ of the tag 1400 may be 5 mm or less, 3 mm or less, or 1 mm or less. Accordingly, the tag 1400 may be of small size. However, the at least three light sources 1411, 1412, 1413 may in general exhibit any distance to the center point $P_C$ of the tag 1400.

In some examples, the at least three light sources 1411, 1412, 1413 may be LEDs (e.g. for emitting infrared light) arranged in a package. For example, the package may comprise a translucent material acting as a lens to direct light emitted by one or more of the at least three light sources 1411, 1412, 1413 in different directions (e.g. the light of each light source). Accordingly, by arranging the package such at the tag 1400 that the at least three light sources 1411, 1412, 1413 are centered around the center point $P_C$ of the tag 1400, the light intensities are distributed in different directions as desired.

Alternatively, the tag 1400 may comprises one or optical elements such as lenses for directing light emitted by one or more of the at least three light sources 1411, 1412, 1413 in different directions (e.g. the light of each light source).

The examples as described herein may be summarized as follows:

Some examples relate to a method for determining rotation parameters for conversion between a first coordinate system associated with a tag and a second coordinate system associated with a ToF camera system configured for sensing the tag. The method comprises determining, based on individual measurements by the ToF camera system of light intensities of at least three light sources of the tag, a first direction vector in the first coordinate system that points from a center point of the tag to the optical center of the ToF camera system. Further, the method comprises determining, based on parameters of the ToF camera system and pixel positions of pixels of an image sensor of the ToF camera system that captured the at least three light sources in the individual measurements of the light intensities, a second direction vector in the second coordinate system that points from the optical center of the ToF camera system to the center point of the tag. The method additionally comprises determining a first auxiliary point in the first coordinate system based on the first direction vector and the center point of the tag, and determining a second auxiliary point in the second coordinate system based on the second direction vector and the optical center of the ToF camera system. The method further comprises determining the rotation parameters based on the center point of the tag, the optical center of the ToF camera system and at least the first and second auxiliary points.

According to some examples, the method further comprises determining a third auxiliary point in the first coordinate system based on the center point of the tag and a third direction vector pointing from the center point of the tag to the earth's center of gravity. Additionally, the method further comprises determining a fourth auxiliary point in the second coordinate system based on the optical center of the ToF camera system and a fourth direction vector pointing from the optical center of the ToF camera system to the earth's center of gravity. Determining the rotation parameters is further based on the third and fourth auxiliary points.

In some examples, the method further comprises receiving, at the ToF camera system, information about the third direction vector from the tag.

Alternatively, the method comprises in some examples reading a priori information about the third direction vector from a data storage of the ToF camera system.

According to some examples, the method further comprises determining the fourth direction vector using an accelerometer of the ToF camera system.

In some examples, at least three rotational axes intersect a normal vector of the tag in the center point of the tag. The at least three rotational axes are perpendicular to the normal vector. Each of the at least three rotational axes extends between a different pair of the at least three light sources. Determining the first direction vector comprises determining light intensity ratios for at least two different pairs of the at least three light sources. Further, determining the first direction vector comprises determining rotation angles for the first direction vector with respect to the rotational axes extending between the at least two pairs of light sources based on a ratio-angle mapping function and the light intensity ratios for the at least two pairs of light sources. Additionally, determining the first direction vector comprises determining the first direction vector based on the normal vector and the rotation angles.

According to some examples, determining the first direction vector based on the normal vector and the rotation angles comprises determining auxiliary rotation matrices for each rotation angle based on the rotation angle and the associated rotation axis, and multiplying the normal vector by the auxiliary rotation matrices for obtaining the first direction vector.

In some examples, the ratio-angle mapping function is based on a simulation.

In alternative examples, the ratio-angle mapping function is based on a calibration of the ToF camera system.

According to some examples, the method further comprises receiving, at the ToF camera system, information related to the center point of the tag from the tag.

Alternatively, the method comprises in some examples reading a priori information related to the center point of the tag from a data storage of the ToF camera system.

In some examples, the ToF camera system individually measures the light intensities of the at least three light sources using phase images taken by the ToF camera system for one or more ToF depth measurements.

The method further comprises in some examples determining data emitted by the tag via a modulated light signal based on the phase images taken by the ToF camera system for the one or more ToF depth measurements.

According to some examples, the rotation parameters are matrix elements of a rotation matrix.

In some examples, the rotation parameters are determined using singular value decomposition.

Other examples relate to an apparatus for determining rotation parameters for conversion between a first coordinate system associated with a tag and a second coordinate system associated with a ToF camera system configured for sensing the tag. The apparatus comprises a processing circuit configured to determine, based on individual measurements by the ToF camera system of light intensities of at least three light sources of the tag, a first direction vector in the first coordinate system that points from a center point of the tag to the optical center of the ToF camera system. Further, the processing circuit is configured to determine, based on parameters of the ToF camera system and pixel positions of pixels of an image sensor of the ToF camera system that captured the at least three light sources in the individual measurements of the light intensities, a second direction vector in the second coordinate system that points from the optical center of the ToF camera system to the center point of the tag. The processing circuit is configured to determine a first auxiliary point in the first coordinate system based on the first direction vector and the center point of the tag, and to determine a second auxiliary point in the second coordinate system based on the second direction vector and the optical center of the ToF camera system. Additionally, the processing circuit is configured to determine the rotation parameters based on the center point of the tag, the optical center of the ToF camera system and at least the first and second auxiliary points.

Further examples relate to a method for determining translation and rotation parameters for conversion between a third coordinate system and a second coordinate system associated with a ToF camera system. The method comprises determining first auxiliary rotation parameters for conversion between a first coordinate system associated with a tag sensed by the ToF camera system and the second coordinate system according to the method for determining rotation parameters as described herein. Further, the method comprises determining first auxiliary translation parameters for conversion between the first coordinate system and the second coordinate system based on one or more ToF depth measurements of the tag. The method comprises determining the rotation parameters based on a combination of the first auxiliary rotation parameters and second auxiliary rotation parameters for conversion between the first coordinate system and the third coordinate system. Additionally, the method comprises determining the translation parameters based on a combination of the first auxiliary translation parameters and second auxiliary translation parameters for conversion between the first coordinate system relative to the third coordinate system.

In some examples, the method further comprises receiving, at the ToF camera system, information about the second auxiliary rotation parameters and the second auxiliary translation parameters from the tag.

Still further examples relate to an apparatus for determining translation and rotation parameters for conversion between a third coordinate system and a second coordinate system associated with a ToF camera system. The apparatus comprises a processing circuit configured to determine first auxiliary rotation parameters for conversion between a first coordinate system associated with a tag sensed by the ToF camera system and the second coordinate system according to the method for determining rotation parameters as described herein. Further, the processing circuit is configured to determine first auxiliary translation parameters for conversion between the first coordinate system and the second coordinate system based on one or more ToF depth measurements of the tag. The processing circuit is configured to determine the rotation parameters based on a combination of the first auxiliary rotation parameters and second auxiliary rotation parameters for conversion between the first coordinate system and the third coordinate system. Additionally, the processing circuit is configured to determine the translation parameters based on a combination of the first auxiliary translation parameters and second auxiliary translation parameters for conversion between the first coordinate system and the third coordinate system.

Examples relate to a non-transitory machine readable medium having stored thereon a program having a program code for performing any of the methods as described herein, when the program is executed on a processor or a programmable hardware.

Other examples relate to a program having a program code for performing any of the methods as described herein, when the program is executed on a processor or a programmable hardware.

Further examples relate to an apparatus for determining rotation parameters for conversion between a first coordinate system associated with a tag and a second coordinate system associated with a ToF camera system configured for sensing the tag. The apparatus comprises means for determining, based on individual measurements by the ToF camera system of light intensities of at least three light sources of the tag, a first direction vector in the first coordinate system that points from a center point of the tag to the optical center of the ToF camera system. Further, the apparatus comprises means for determining, based on parameters of the ToF camera system and pixel positions of pixels of an image sensor of the ToF camera system that captured the at least three light sources in the individual measurements of the light intensities, a second direction vector in the second coordinate system that points from the optical center of the ToF camera system to the center point of the tag. The apparatus comprises means for determining a first auxiliary point in the first coordinate system based on the first direction vector and the center point of the tag, and means for determining a second auxiliary point in the second coordinate system based on the second direction vector and the optical center of the ToF camera system. Additionally, the apparatus comprises means for determining the rotation parameters based on the center point of the tag, the optical center of the ToF camera system and at least the first and second auxiliary points.

Still further examples relate to an apparatus for determining translation and rotation parameters for conversion between a third coordinate system and a second coordinate system associated with a ToF camera system. The apparatus comprises means for determining first auxiliary rotation parameters for conversion between a first coordinate system associated with a tag sensed by the ToF camera system and the second coordinate system according to the method for determining rotation parameters as described herein. Further, the apparatus comprises means for determining first auxiliary translation parameters for conversion between the first coordinate system relative to the second coordinate system based on one or more ToF depth measurements of the tag. The apparatus comprises means for determining the rotation parameters based on a combination of the first auxiliary rotation parameters and second auxiliary rotation parameters for conversion between the first coordinate system and the third coordinate system. Additionally, the apparatus comprises means for determining the translation parameters based on a combination of the first auxiliary translation parameters and second auxiliary translation parameters for conversion between the first coordinate system and the third coordinate system.

Some examples relate to a tag for ToF applications. The tag comprises at least three light sources configured to controllably emit light and a light detector configured to receive one or more modulated light signals from a ToF camera system. Further, the tag comprises a processing circuit configured to determine one or more time periods in which the ToF camera system is sensitive for light reception. The processing circuit is additionally configured to control the at least three light sources to sequentially and individually emit light according to a predefined lighting pattern during the one or more time periods.

According to some examples, at least two of the at least three light sources are tilted with respect to each other so that the at least two light sources emit light in different directions.

In some examples, the tag further comprises a barrier arranged between two of the at least three light sources, wherein the barrier is configured to block part of the light emitted by each of the two light sources.

The processing circuit is in some examples further configured to control the at least three light sources to sequentially and individually emit light based on synchronization information derived from the one or more modulated light signals or from one or more radio frequency signals received by a radio frequency receiver of the tag.

According to some examples, the at least three light sources are arranged in a circular pattern around a center point of the tag.

In some examples, the processing circuit is further configured to control one or more of the at least three light sources to emit light representing data to be transmitted to the ToF camera system during the one or more time periods.

Examples according to the present disclosure may enable 6DoF localization of a tag with a ToF camera.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for determining rotation parameters for conversion between a first coordinate system associated with a tag and a second coordinate system associated with a time-of-flight (ToF) camera system configured for sensing the tag, the method comprising:
    determining, based on individual measurements by the ToF camera system of light intensities of at least three light sources of the tag, a first direction vector in the first coordinate system that points from a center point of the tag to an optical center of the ToF camera system;
    determining, based on parameters of the ToF camera system and pixel positions of pixels of an image sensor of the ToF camera system that captured the at least three light sources in the individual measurements of the light intensities, a second direction vector in the second coordinate system that points from the optical center of the ToF camera system to the center point of the tag;
    determining a first auxiliary point in the first coordinate system based on the first direction vector and the center point of the tag;
    determining a second auxiliary point in the second coordinate system based on the second direction vector and the optical center of the ToF camera system; and
    determining the rotation parameters based on the center point of the tag, the optical center of the ToF camera system and at least the first and second auxiliary points.

2. The method of claim 1, further comprising:
    determining a third auxiliary point in the first coordinate system based on the center point of the tag and a third direction vector pointing from the center point of the tag to the earth's center of gravity; and
    determining a fourth auxiliary point in the second coordinate system based on the optical center of the ToF camera system and a fourth direction vector pointing from the optical center of the ToF camera system to the earth's center of gravity,
    wherein determining the rotation parameters is further based on the third and fourth auxiliary points.

3. The method of claim 2, further comprising:
    receiving, at the ToF camera system, information about the third direction vector from the tag.

4. The method of claim 2, further comprising:
    reading a priori information about the third direction vector from a data storage of the ToF camera system.

5. The method of claim 1, wherein at least three rotational axes intersect a normal vector of the tag in the center point of the tag, wherein the at least three rotational axes are perpendicular to the normal vector, wherein each of the at least three rotational axes extends between a different pair of the at least three light sources, and wherein determining the first direction vector comprises:
    determining light intensity ratios for at least two different pairs of the at least three light sources;
    determining rotation angles for the first direction vector with respect to the rotational axes extending between the at least two pairs of light sources based on a ratio-angle mapping function and the light intensity ratios for the at least two pairs of light sources; and
    determining the first direction vector based on the normal vector and the rotation angles.

6. The method of claim 1, further comprising:
    receiving, at the ToF camera system, information related to the center point of the tag from the tag.

7. The method of claim 1, further comprising:
    determining data emitted by the tag via a modulated light signal based on phase images taken by the ToF camera system for one or more ToF depth measurements.

8. An apparatus for determining rotation parameters for conversion between a first coordinate system associated with a tag and a second coordinate system associated with a time-of-flight (ToF) camera system configured for sensing the tag, the apparatus comprising a processing circuit configured to:
    determine, based on individual measurements by the ToF camera system of light intensities of at least three light sources of the tag, a first direction vector in the first coordinate system that points from a center point of the tag to the optical center of the ToF camera system;
    determine, based on parameters of the ToF camera system and pixel positions of pixels of an image sensor of the ToF camera system that captured the at least three light sources in the individual measurements of the light intensities, a second direction vector in the second coordinate system that points from the optical center of the ToF camera system to the center point of the tag;
    determine a first auxiliary point in the first coordinate system based on the first direction vector and the center point of the tag;
    determine a second auxiliary point in the second coordinate system based on the second direction vector and the optical center of the ToF camera system; and
    determine the rotation parameters based on the center point of the tag, the optical center of the ToF camera system and at least the first and second auxiliary points.

9. A method for determining translation and rotation parameters for conversion between a third coordinate system and a second coordinate system associated with a time-of-flight (ToF) camera system, the method comprising:
    determining, based on individual measurements by the ToF camera system of light intensities of at least three light sources of a tag sensed by the ToF camera system, a first direction vector in a first coordinate system that points from a center point of the tag to an optical center of the ToF camera system;
    determining, based on parameters of the ToF camera system and pixel positions of pixels of an image sensor of the ToF camera system that captured the at least three light sources in the individual measurements of the light intensities, a second direction vector in the second coordinate system that points from the optical center of the ToF camera system to the center point of the tag;
determining a first auxiliary point in the first coordinate system based on the first direction vector and the center point of the tag;
determining a second auxiliary point in the second coordinate system based on the second direction vector and the optical center of the ToF camera system;
determining first auxiliary rotation parameters based on the center point of the tag, the optical center of the ToF camera system and at least the first and second auxiliary points;
determining first auxiliary translation parameters for conversion between the first coordinate system and the second coordinate system based on one or more ToF depth measurements of the tag;
determining the rotation parameters based on a combination of the first auxiliary rotation parameters and second auxiliary rotation parameters for conversion between the first coordinate system and the third coordinate system; and
determining the translation parameters based on a combination of the first auxiliary translation parameters and second auxiliary translation parameters for conversion between the first coordinate system relative to the third coordinate system.

10. The method of claim 9, further comprising:
receiving, at the ToF camera system, information about the second auxiliary rotation parameters and the second auxiliary translation parameters from the tag.

11. An apparatus for determining translation and rotation parameters for conversion between a third coordinate system and a second coordinate system associated with a time-of-flight (ToF) camera system, the apparatus comprising a processing circuit configured to:
determine, based on individual measurements by the ToF camera system of light intensities of at least three light sources of a tag sensed by the ToF camera system, a first direction vector in a first coordinate system that points from a center point of the tag to the optical center of the ToF camera system;
determine, based on parameters of the ToF camera system and pixel positions of pixels of an image sensor of the ToF camera system that captured the at least three light sources in the individual measurements of the light intensities, a second direction vector in the second coordinate system that points from the optical center of the ToF camera system to the center point of the tag;
determine a first auxiliary point in the first coordinate system based on the first direction vector and the center point of the tag;
determine a second auxiliary point in the second coordinate system based on the second direction vector and the optical center of the ToF camera system; and
determine first auxiliary rotation parameters based on the center point of the tag, the optical center of the ToF camera system and at least the first and second auxiliary points
determine first auxiliary translation parameters for conversion between the first coordinate system and the second coordinate system based on one or more ToF depth measurements of the tag;
determine the rotation parameters based on a combination of the first auxiliary rotation parameters and second auxiliary rotation parameters for conversion between the first coordinate system and the third coordinate system; and
determine the translation parameters based on a combination of the first auxiliary translation parameters and second auxiliary translation parameters for conversion between the first coordinate system and the third coordinate system.

* * * * *